Patented Feb. 7, 1939

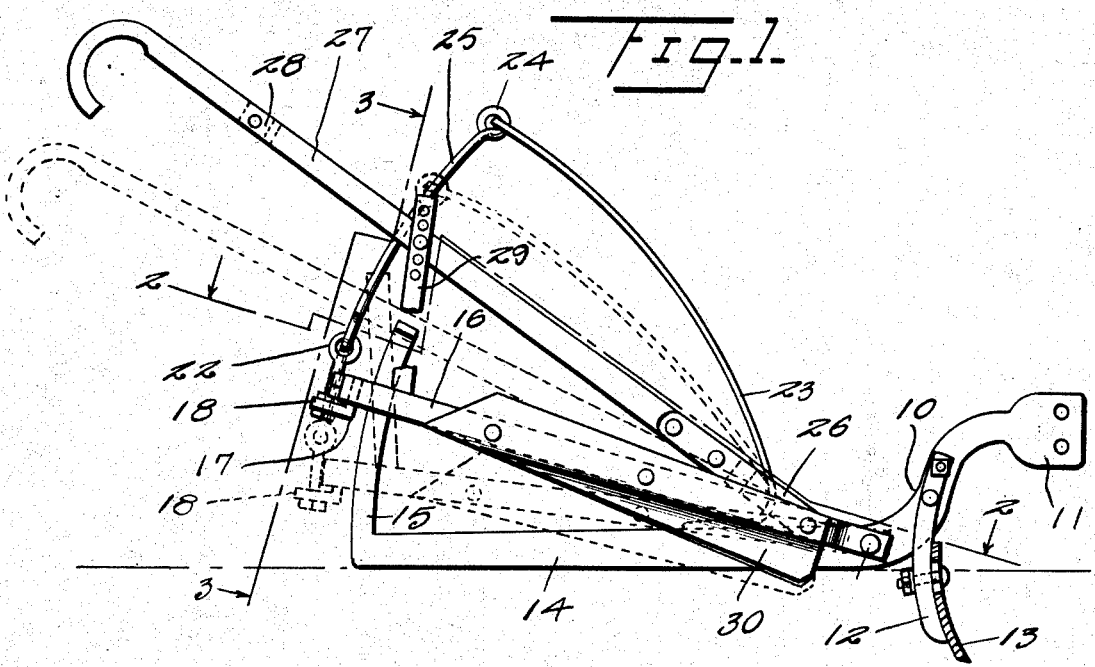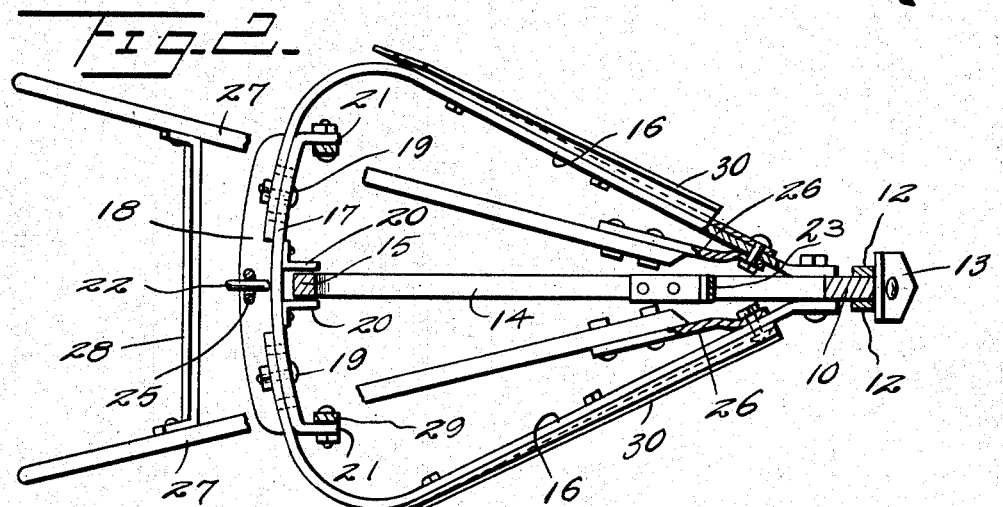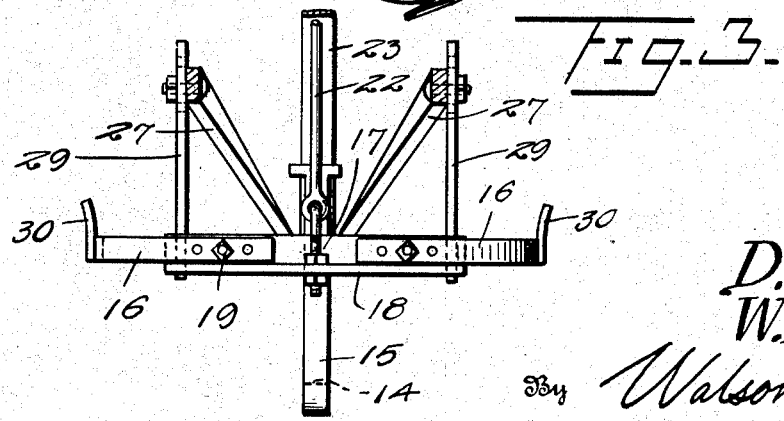

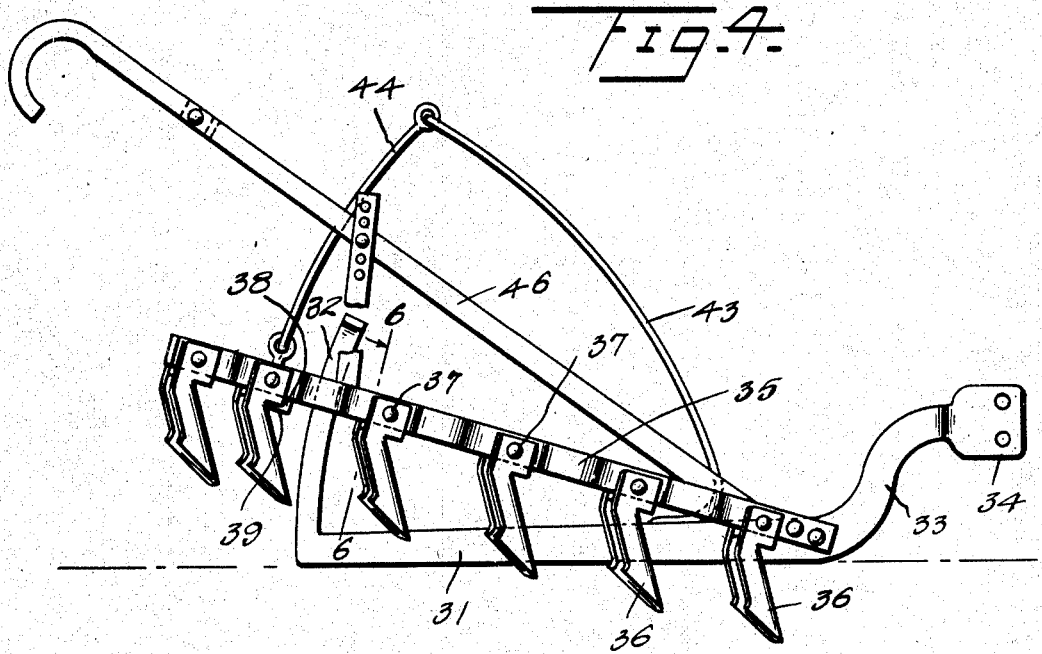
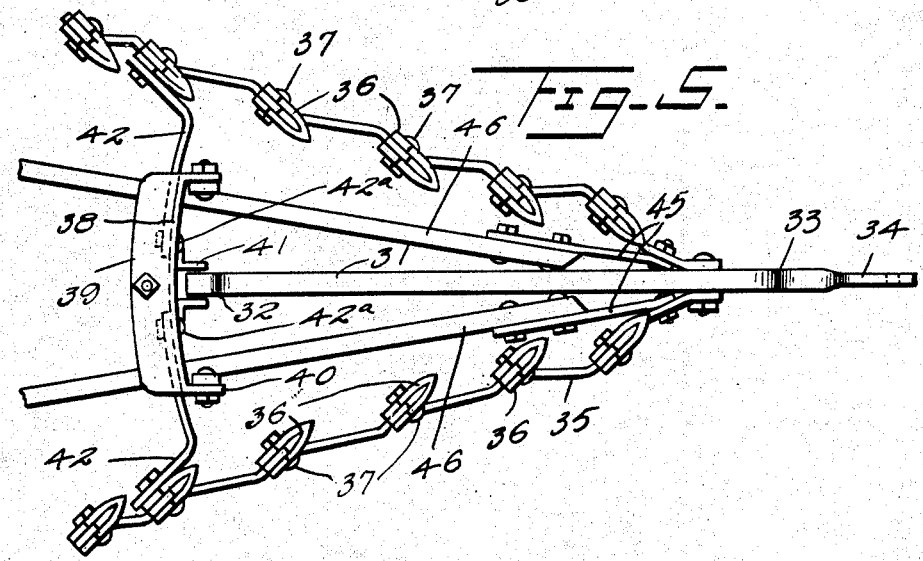
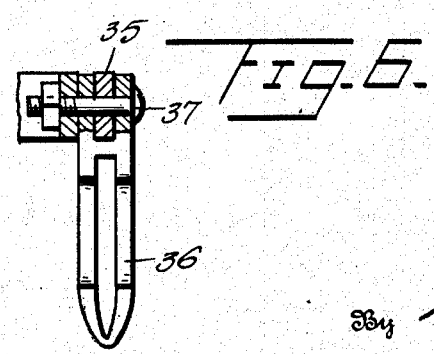

2,146,337

UNITED STATES PATENT OFFICE 2,146,337

ROW CULTIVATING IMPLEMENT

Daniel C. Hall and William M. Hall, Pompano, Fla., assignors of one-half to Henry L. Lyons, Pompano, Fla.

Application April 12, 1937, Serial No. 136,497

3 Claims. (Cl. 97—171)

This invention relates to cultivating devices, using the term "cultivator" in its broadest sense, and particularly to devices for the cultivation of beans, corn or like crops, where it is necessary at certain stages to throw the earth over onto the roots of the plant and in certain other stages to stir up the earth around the base of the plant.

Crops of this character and many others, are planted in rows and it is often the case that two rows are closer together at one portion of a field than at another, it being practically impossible to get the rows the same distance apart along the rows.

With this in mind, it is one object of this invention to provide a cultivating mechanism in which the cultivating implements, either in the form of longitudinally extending blades or in the form of teeth arranged in rows, are disposed on forwardly convergent lines and in which the implements, that is, the blades or the teeth, as the case may be, are yieldingly supported at an upward and rearward inclination or slant, so that when the handles of the machine are depressed, the rear ends of the implements will be depressed and the implements will thus be in effect further apart or spaced laterally a greater distance than when the handles are not depressed. Thus when the implements are fully raised, only the forward ends of the two blades, for instance, or the forward pair of teeth, will engage the ground and when fully depressed, the rearmost portions of the blades or the rearmost pairs of teeth, which are spaced apart furtherest, will engage the ground.

A further object is to provide a runner disposed between the two divergent implements and a spring which urges the implements upward relative to the runner but permits the operator to depress the implements to thus bring the more widely spaced implements into action as desired.

A still further object is to provide two machines operating on the same principle, one for use in throwing the soil of a furrow over the plants and thus covering the plants, and the other for opening up the furrows so that the roots of the plants will get air.

Other objects will appear in the course of the following description.

My invention is illustrated in the accompanying drawings wherein:

Figure 1 is a side elevation of one embodiment of our invention in dotted lines showing a selected depression of the earth deflecting blades.

Figure 2 is a section on the line 2—2 of Figure 1.

Figure 3 is a section on the line 3—3 of Figure 1.

Figure 4 is a side elevation of another embodiment of my invention.

Figure 5 is an under plan view thereof.

Figure 6 is an enlarged sectional view on the line 6—6 of Figure 4.

In Figures 1 to 3, we have illustrated that form of our invention which is particularly adapted for the purpose of throwing the earth of a furrow over upon two rows of plants. In these figures, 10 designates the forward end of a beam, this forward end being upwardly and then forwardly curved to form an enlarged head 11 upon which the clevis of a draft device may be applied. To this upwardly extending neck of the beam 10, there are bolted the two downwardly extending feet 12 to which a cultivator blade 13 is adjustably bolted.

The beam 10 is carried rearward and downward, as at 14, to constitute a runner and then is upwardly extended, as at 15, this upward extension being slightly arcuate. Pivoted to the forward end of this runner or beam are the two rearwardly and outwardly extending frame bars 16. These extend rearwardly and outwardly, divergently with relation to each other and at their rear ends are curved rearwardly and inwardly. Connecting these curved ends is a yoke 17 which is angular in cross-section to provide a flange 18. The inwardly extended extremities of the bars 16 rest upon this flange 18 and are bolted to this yoke by bolts 19. The extremities of the bars 16 and the end portions of the yoke 18 have a plurality of bolt holes so that these bars 16 may be drawn in towards each other or expanded as desired. The middle of the yoke 18 is provided with inwardly extending lugs 20 and the extremities of the yoke are provided with the forwardly extending ears 21. The lugs 20 loosely embrace the arcuate portion 15 of the runner 14. Extending through the middle of the flange 18 is an eye-bolt 22. Attached to the beam or runner 14 in any suitable manner is the forward end of a spring 23. The forward end of this spring may be brazed, bolted or otherwise attached to the runner and the spring extends forward and then upward and rearward and at its end is formed with an eye for engagement with the eye 24 of a downwardly and rearwardly curved connecting rod 25, which at its lower end is engaged with the eye-bolt 22. It will be seen that when the frame bar 16 and the yoke 17 are pushed downward, assuming that the runner is in engagement with the ground, the spring 23 will be flexed and placed under tension and as soon as the downward pressure on the bar 16 is relieved, the spring will urge these bars 16 upward.

Pivoted to the forward ends of the bars 16 are the irons or straps 26 to which the handles 27 are bolted, these handles extending upward and rearward considerably beyond the yoke 18 and the handles are braced apart at their rear ends by means of the brace 28. Pivoted to these handle bars 27 are links 29 which extend downward and are in turn pivoted to the inwardly turned ears 21 of the yoke 17.

Attached to the outer faces of the irons 16 are furrow blades 30. These blades are bolted to the bars 16 and are wider than the bars 16 so that they extend below and above these bars. These blades are deflected vertically toward their rear ends and the forward ends of the blades are slightly concave vertically so that the blades will act to overturn the earth of a furrow and cast this earth laterally over onto the plants.

Where the rows are close together, the runner 14 rides along on the surface of the ground between the rows. The bar 16 with the furrow blades 30 extend downward and forward and thus only the forward ends or forward portions of the furrow bars will cast the earth laterally. Where, however, the space between the rows widens, then the operator depresses the handles 27 and this, through the links 29, forces the bars 16 downward and, of course, forces the blades 30 downward so that the rearward portion of each blade is brought into action. If the distance between the rows grows still wider, the operator presses the handle-bars still further down so that the rearmost portions of the blades then act, and as they are wider apart than the forward portions of the blades, they will act to throw dirt over on these plants which are further apart from each other. It will be seen that the furrow-blade-carrying bars or frame may be moved up or down at the will of the operator in accordance with the width between the rows. Thus with this implement, when the rows narrow down while it is being used, the operator can ease up on the runner under the machine and the blades will throw a lighter furrow, and then when the implement is pressed down by pushing on the handles, then the furrow is heavier and the blades will throw the soil over onto the plants when the furrows are wider apart.

The same principle of operation may be applied to a machine for "cultivating", that is, plowing up and loosening the ground between the rows, and in Figures 4 to 6, we show such a machine. In these figures, 31 designates the runner, the rear end of which is formed with the arcuate upwardly extending portion 32 and the forward end of which is formed with the upwardly extending neck 33 having a head 34 for the application of a clevis or other draft device. Pivoted to the forward end of the bar 31 are the tooth carrying bars 35. These bars extend divergently with relation to the runner 31 and the bars, as illustrated, are zig-zag in form so as to provide portions extending directly rearward, then angularly outward and rearward, then directly rearward, etc. To the angular portions of these bars 35 there are attached the cultivator points or plows 36. These may be of any suitable character but are illustrated as being formed to embrace the bars 35 and to be bolted thereto by bolts 37.

The bars 35 are connected by means of a yoke 38 which has a horizontal flange 39, the ends of the yoke extending inward, as at 40, and the middle portion of the yoke being provided with the lugs 41 to act as guides for the arcuate upturned portion 32 of the runner. Bolted to the yoke are the two relatively short bars 42 which are angularly bent at their ends and bolted to the tooth carrying bars 35. These short bars 42 are provided with a plurality of openings as is the yoke through which these bolts 42a may pass and thus the tooth carrying bars 35 may be adjusted nearer to or further from each other.

Attached to the forward end of the runner 31 is the spring 43 of the same construction as the spring 23 which extends rearward and is connected by means of the connecting rod 44 to an eye-bolt on the yoke. Also bolted to the forward ends of the tooth carrying bars 35 are the irons 45, and bolted to these irons are the handle bars 46 which extend rearward and upward and then downward as usual, and are connected by a brace as heretofore described.

In the use of this implement, if the rows are close together, only the forward teeth will travel along the rows and break up the earth immediately around the roots of the plant so as to give the plant air. If, however, the rows widen, the handles are depressed, which forces the upwardly and rearwardly inclined tooth carrying bars 35 downward, so as to bring a rearward pair of teeth into play, and if the rows are still wider, the handles are depressed still more until if the rows are very wide, the handles are depressed so as to bring the rearmost teeth into operative relation to the row to thus break up the earth around the roots of the plants. It will be seen that the two implements operate on the same principle, though they are to be used for two different purposes, one to throw loose earth over onto the plants or seeds, as for instance, immediately after planting, and the other to stir up the earth adjacent the plants so as to aerate the roots thereof. It will be understood, of course, that the cultivator teeth will operate over the entire space between the rows of plants.

While we have illustrated certain particular details and certain arrangement of parts, we do not wish to be limited thereto as obviously the mechanism might be varied in many ways without departing from the spirit of the invention as defined in the appended claims.

What is claimed is:—

1. A cultivator of the character described, including a beam formed to provide a longitudinally extending ground engaging runner, the forward end of the beam extending upward and then forward, implement-carrying bars pivoted to the forward end of the runner and extending rearwardly and laterally therefrom, a transversely extending yoke operatively connected to the rear ends of the implement-carrying bars, the runner having an upwardly extending portion at its rear end and the yoke having guide lugs embracing the last named portion of the runner, handle bars connected to the forward ends of the implement-carrying bars and extending upward and rearward therefrom, links connecting the handle bars to the yoke, a spring urging the yoke and implement-carrying bars upward with relation to the runner, and a plurality of cultivator teeth mounted upon the implement-carrying bars one behind the other.

2. A cultivator of the character described, including a beam having a longitudinally extending runner, the rear end of the runner being upwardly turned, the forward end of the beam extending upward and forward, implement-carrying bars pivoted at their forward ends to the forward end of the runner and extending rearward and laterally in divergent relation to each other and the runner, each of said implement-carrying bars having a zig-zag formation, a yoke operatively connected to the implement-carrying bars and having guiding engagement with the upwardly turned rear end of the runner, handle bars attached at their forward ends to the implement-carrying bars and extending upward and rearward above the yoke, links connecting the yoke to the handle bars, a spring attached to the forward end of the runner and extending upward and rearward therefrom and at its rear end having linked connection to the yoke, and a series of cultivator teeth mounted upon each implement-carrying bar.

3. A cultivator, including a beam having a ground engaging runner, the rear end of the runner extending upward and slightly inward in a curve, implement supporting bars pivoted at their forward ends to the forward ends of the runner and extending rearwardly and laterally in divergent relation to each other and to the runner, a transversely extending yoke having forwardly projecting extensions at its ends and at its middle having spaced lugs receiving between them the upwardly extending rear portion of the runner, the yoke having a rearwardly extending flange, means connecting the rear ends of the implement supporting bars to the yoke and resting on the upper surface of said flange, said means being constructed and arranged for adjustment transversely of the runner whereby to increase or decrease the distance between the rear ends of the implement supporting bars, handle bars operatively bolted to the implement supporting bars adjacent the pivots thereof, vertically adjustable links connecting said handle bars to the forwardly projecting extensions of the yoke, a spring having a reverted forward end attached to the forward end of the runner, the spring extending upward and rearward above the handle bars, a rigid link pivotally connected at its upper end to the rear end of the spring, and an I-bolt extending through the flange of the yoke and to which the lower end of the link is operatively connected.

DANIEL C. HALL.
WILLIAM M. HALL.